United States Patent [19]
Anders

[11] 4,033,556
[45] July 5, 1977

[54] END THRUST BEARING ARRANGEMENTS FOR SCREW EXTRUDERS

[75] Inventor: Dietmar Anders, Hannover, Germany

[73] Assignee: Hermann Berstorff Maschinenbau GmbH, Wiese, Germany

[22] Filed: June 11, 1976

[21] Appl. No.: 695,041

[30] Foreign Application Priority Data
June 19, 1975 Germany .......................... 2527365

[52] U.S. Cl. .................. 259/191; 277/30; 308/72
[51] Int. Cl.² ...................... B29B 1/06; F16C 25/00
[58] Field of Search ............. 259/191, 192, 193, 9, 259/10, 25, 26, 109, 110; 308/72, 140; 425/208, 209; 277/30, 33

[56] References Cited

UNITED STATES PATENTS

| | | | |
|---|---|---|---|
| 2,860,895 | 11/1958 | Mosbacher | 277/30 |
| 3,310,836 | 3/1967 | Nichols | 259/191 |
| 3,700,247 | 10/1972 | Butler | 259/191 |
| 3,908,968 | 9/1975 | Bernd | 259/191 |
| 3,945,621 | 3/1976 | Hertog | 259/191 |

*Primary Examiner*—Robert W. Jenkins
*Attorney, Agent, or Firm*—Donald D. Jeffery

[57] ABSTRACT

An end thrust bearing arrangement for the shaft of a screw extruder driven by a gear drive, in which misalignment of the gear drive output shaft and the shaft of the extruder screw is compensated by a co-rotation thrust member provided between the screw and a tapered roller bearing which axially supports the shaft of the extruder screw, an end of shaft of the extruder screw projecting through the thrust member and being coupled to the gear drive output shaft to be rotated thereby, and an elastically deformable sleeve surrounding the end of the shaft of the screw and coaxial therewith, one end of the elastically deformable sleeve being attached to the thrust member and the other end being attached to the gear drive output shaft. If desired the thrust member of the elastically deformable sleeve can be formed integral one with the other.

2 Claims, 1 Drawing Figure

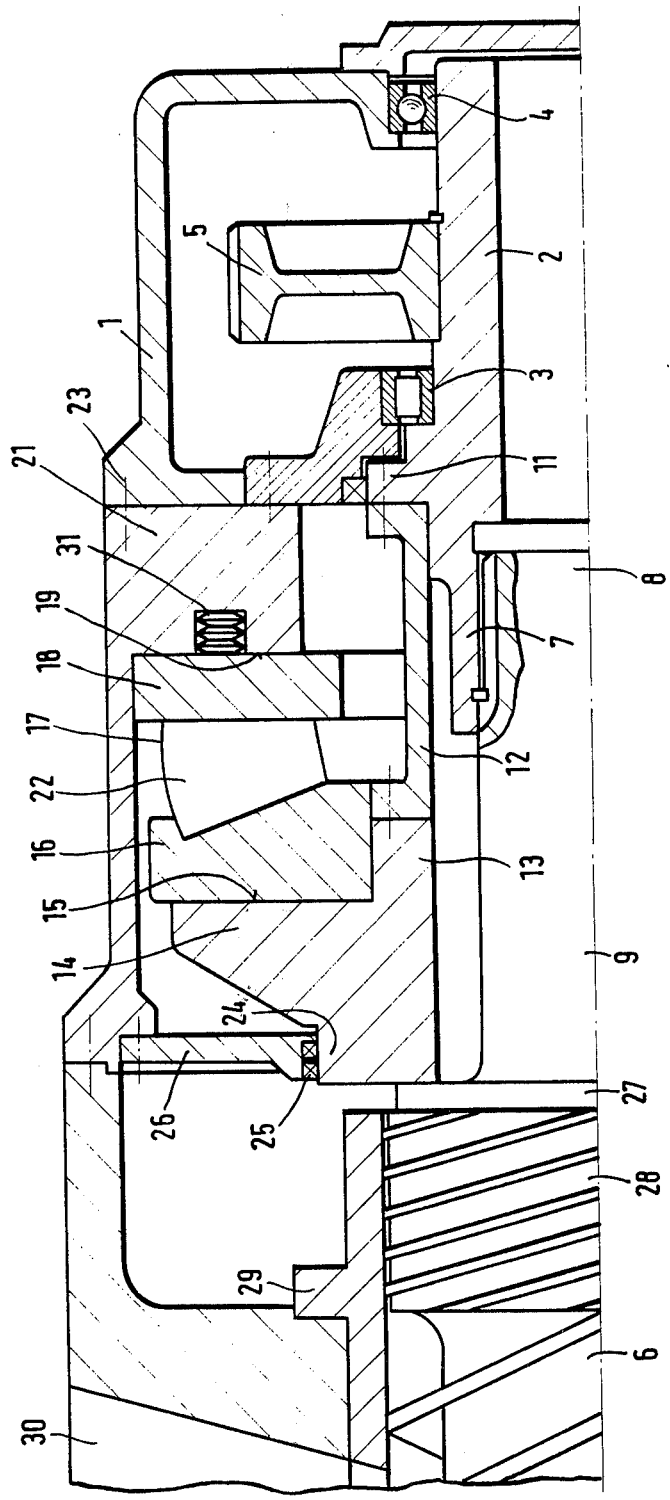

END THRUST BEARING ARRANGEMENTS FOR SCREW EXTRUDERS

BACKGROUND OF THE INVENTION

The invention relates to screw extruders and more particularly to end thrust bearing arrangements for the screws of screw extruders driven through reduction gearing.

For the mounting of the screw shaft, it has been previously proposed to provide a self-centering, self-aligning roller bearing which accommodates the axial loading of the screw. Self-aligning roller bearings have proved successful because they are evenly loaded even where there are production-occasioned deviations in alignment between screw and cylinder and also between screw shaft and drive gearing output shaft.

With increasing screw diameters, the costs of the self-aligning roller bearings, which are no longer available as a standard item for maximum screw diameters, increase. Furthermore, in the case of maximum screw diameters, the self-aligning roller bearing required to guarantee the carrying capacity has to be of considerable overall size. The large outside diameter of such a self-aligning roller bearing also results in considerable structural dimensions of the extruder housing, which ought not to exceed certain limits on grounds of space and cost.

Therefore, for large screw diameters and high operating pressures, screw extruder manufacturers have again resorted to the use of tapered roller bearing which, for an equivalent carrying capacity, have a considerably smaller outside diameter than self-aligning roller bearings. However, for them to be evenly loaded, tapered roller bearings impose exacting demands in terms of manufacturing tolerances. For large screw diameters and high working pressures, the necessary close manufacturing tolerances for the installation of tapered roller bearings onto current machine tools can no longer be achieved. Inaccuracy of alignment between the drive gearing output shaft and the screw shaft can however not be compensated by tapered roller bearings and the result is edge pressure on the rolling members of the tapered roller bearings and a consequent reduction in working life.

The invention has among its objects to provide an end thrust bearing arrangement for a screw extruder of the kind described at the outset in which damage to the end thrust bearing due to the inevitable inaccuracies in alignment of the drive gearing output shaft and the shaft of the screw extruder is prevented.

SUMMARY OF THE INVENTION

According to the invention, there is provided an extruder having a screw driven through a reduction gearing, with a tapered roller bearing supporting said screw in an axial direction, the improvement comprising a co-rotating thrust member provided between the screw and the tapered roller bearing, an end of a shaft of said screw projecting through said thrust member and being coupled to an output shaft of said gearing to be rotated thereby, and an elastically deformable sleeve surrounding said end of said shaft of said screw and coaxial therewith, one end of said elastically deformable sleeve being attached to thrust member and the other end being attached to said output shaft of said gearing.

The elastically deformable sleeve, which is of a small wall thickness, does not transmit the wobble movement of the gear output shaft to the thrust member and thus to the tapered roller bearing. The wobble movement is compensated by elastic deformation of the coaxial sleeve. The stationary and rotating bearing faces of the races of the tapered roller bearing, which are at right-angles to the screw axis, remain parallel to one another. The tapered rollers rest on the bearing faces of the races over their entire length. Tilting of the tapered roller bearing which could result in harmful edge pressure is prevented.

A further advantage of the invention resided in the fact that due to the elastic connection a radial bearing supporting the end of the gear output shaft, which radial bearing in the event of any deviation in alignment is likewise subject to varying loadings, is better protected.

In an advantageous further development of the invention, the thrust member and the elastically deformable sleeve are formed integral one with the other.

BRIEF DESCRIPTION OF DRAWING

The invention is diagrammatically illustrated by way of example with reference to the accompanying drawing which is a sectional view through a coupling between a gear drive and an extruder screw incorporating an end thrust bearing arrangement according to the invention.

DESCRIPTION OF SPECIFIC EMBODIMENT

Referring to the drawing a hollow gear output shaft 2 is rotatably mounted in a radial roller bearing 3 and a radial ball bearing 4 in a gearbox 1 of a reduction gearing of which only a part is shown. Rotationally rigidly disposed on the gear output shaft 2 is an output gearwheel 5 of the reduction gearing. The end 7 of the output shaft 2 which is towards an extruder screw 6 is provided with internal splining into which external splining on the adjacent end 8 of a screw shaft 9 engages.

Flanged at one end on an annular projection 11 on the end 7 of the output shaft 2 and extending over the coupling between the ends 7 and 8 of the output shaft 2 and the screw shaft 9 is a sleeve 12, the other end of which is bolted onto the end face of a step 13 of a rotatably mounted thrust member 14. The thrust member 14 forms a bearing face 15 for one race 16 of a tapered roller bearing 17, of which the other, fixed, race 18 is supported on a bearing face 19 of a bearing housing 21. The tapered rollers 22 rest for their entire length on the races 16 and 18.

The bearing housing 21 and the gearbox 1 are connected to each other by bolts 23.

The thrust member 14 has a guide projection 24 which is guided in a middle bore which is provided with sealing rings 25 and located in an annular end piece 26 bolted onto the bearing housing 21. Bearing against the end face of the guide projection 24 is a screw shaft collar 27 adjacent to which there is a portion of return threading 28 and the actual flighted screw part 6 which are guided in a screw cylinder 29. The screw cylinder 29 is discontinuous in order to receive a material charging hopper 30.

Plate springs 31 disposed in the bearing housing 21 pre-tension the tapered roller bearing 17.

When the screw extruder is operating, rearwardly directed axial forces generated by the conveying screw 6 which is guided closely inside the screw cylinder 29 are absorbed by the tapered roller bearing 17 which is disposed as an end thrust bearing, through the co-rotating thrust member 14.

By virtue of inevitable deviations in alignment of the gear output shaft 2 from the location of the cylinder bore 29, occasioned in production, the gear output shaft 2 performs a wobbling movement. The thrust member 14 which is connected to the gear output shaft 2 via the rigidly connected sleeve 12 does not follow this wobbling movement, since the thin-walled sleeve 12 is elastically deformed due to the deviations in alignment and therefore compensates for them. The bearing faces 15, 19 of the axial thrust bearing 17 remain parallel with one another. The tapered rollers 22 lie, in terms of alignment, on the races 16 and 18. Tilting of the end thrust bearing 17 with the harmful edge pressure is therefore avoided.

Instead of the separate elastically deformable sleeve 12, the thrust member 14 may be provided with an integral sleeve-like projection of minimal wall thickness.

What is claimed is:

1. In an extruder having a screw driven through a reduction gearing, with a tapered roller bearing supporting said screw in an axial direction, the improvement comprising a co-rotating thrust member provided between the screw and the tapered roller bearing, an end of a shaft of said screw projecting through said thrust member and being coupled to an output shaft of said gearing to be rotated thereby and an elastically deformable sleeve surrounding said end of said shaft of said screw and coaxial therewith, one end of said elastically deformable sleeve being attached to said thrust member and the other end being attached to said output shaft of said gearing.

2. The invention of claim 1, wherein said thrust member and said elastically deformable sleeve are formed integral one with the other.

* * * * *